Feb. 28, 1961 M. A. MOSKOVITZ 2,973,213
AXIAL AND THRUST-ABSORBING RESILIENT PIVOT JOINTS
Filed June 22, 1959
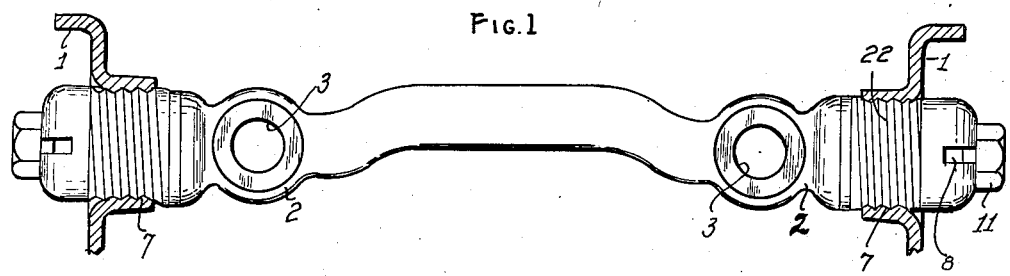
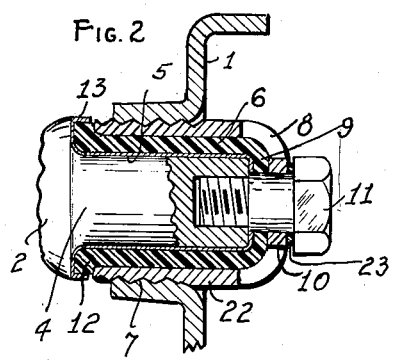
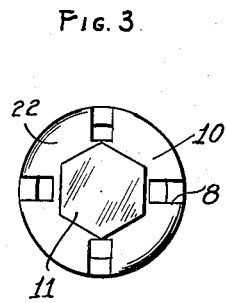
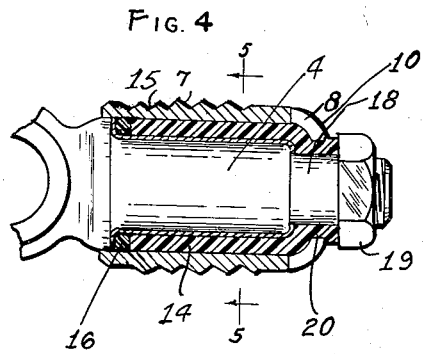
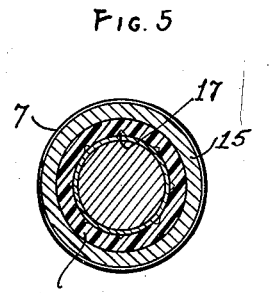
INVENTOR
MILTON A. MOSKOVITZ
By: Ben V. Zillman
ATTORNEY United States Patent Office 2,973,213
Patented Feb. 28, 1961

2,973,213

AXIAL AND THRUST-ABSORBING RESILIENT PIVOT JOINTS

Milton A. Moskovitz, 8531 Antler Drive, Richmond Heights, Mo.

Filed June 22, 1959, Ser. No. 821,810

5 Claims. (Cl. 287—85)

This invention relates to improvements in pivot joints and more particularly to those used in automotive vehicle constructions, as for instance as suspension pivots for the suspension control arms of such vehicles wherein it is required to absorb both radial and longitudinal stresses between the cooperating members.

The upper and lower control arms of such vehicles are generally provided with ball joints or the like at their outer ends for operative relation with the front wheel-supporting spindles. These upper and lower control arms have pivotal movement on substantially horizontal axes relative to the generally horizontal axis of the vehicle itself.

This invention has among its general objects the production of such a pivot joint that will tend to eliminate undesirable torsional build-up of load of conical deflections that sometimes result from the use of bonded-to-rubber metal bushings sometimes used in such service, will be relatively simple to make and install, economical, have great longevity, and be highly safe, satisfactory and efficient for use wherever deemed applicable.

One of the principal objects of my invention is to construct such a joint that will have a very low frictional characteristic, making use of a durable plastic that will be substantially self-lubricating.

Another object of the invention is to provide in such a joint, a substitute for the usual metal-to-metal contact of threaded-type bushings, so as to substitute positive and predetermined bearing contact areas for indeterminate and inaccurate thread contact areas that must have some play or clearance at the cooperating threads.

An added object of my invention is to so construct such a joint that the axial positioning between the interconnected cooperating members remains constant so that there is no longitudinal shifting of the control arm under longitudinal thrust.

A still further object of the invention is to provide such a joint having low-friction bearing surfaces that will absorb the radial and longitudinal stresses that are transmitted between the control arm and the pivot member and wherein end thrust can be adjusted as needed, to insure close tolerance, quietness and extended life for the effective life of the parts.

Many other objects and advantages of the construction herein shown and described, and the uses mentioned, will be obvious to those skilled in the art to which this invention appertains, and which will be more clearly evident from the disclosures herein.

To this end, my invention consists in the novel construction, arrangement and combination of parts herein shown and described, all as will be more clearly pointed out in the claims hereunto appended.

In the drawings, wherein like reference characters represent like or corresponding parts throughout the views, Figure 1 is a plan view of a control arm and pivot assembly;

Figure 2 is an enlarged fragmentary view, partly in section, showing the construction of one of the pivot joints;

Figure 3 is a side elevation of the parts shown in Fig. 2, with the arm omitted;

Figure 4 is an enlarged fragmentary view, partly in section, of a modified form of joint, with the arm omitted; and Figure 5 is a cross-section detail, taken substantially along the line 5—5 of Fig. 4.

Referring more particularly to the drawings, wherein I have illustrated preferred embodiments of my invention, there is shown a pivot joint that is especially useful in automotive vehicles, as in the wheel suspensions of the same, that employ control arms, an end of one of which is indicated at 1, and that is in turn pivotally mounted relative to a support pivot member 2 by said joint.

Each front wheel of the vehicle is connected to a steering knuckle, which is in turn connected to the control arm by a ball joint or a king-pin (said parts not being shown inasmuch as they are of common construction), so that the associated parts allow up and down suspension action of the parts and proper steering of the vehicle.

It is therefore important that in order to achieve excellent ride characteristics, the dynamic and static frictional forces be very low and remain controlled. Also, that the connection be such as will tend to stabilize the suspension system and will not allow conical deflection of the bushings and arms—especially in vehicles having anti-dive braking wherein the arms are tilted and aligned with the centre of gravity to prevent pitching of the front and rear of the vehicle during braking. Hence, the pivots must absorb most of these forces, longitudinal as well as radial.

The pivot member is of any desired or suitable construction, generally in the form of a rigid bar having substantially cylindrical extensions at both its ends, said bar being intended to be rigidly attached to a firm supporting structure such as the vehicle frame, by bolts or the like through the bolt holes 3—3 placed near the cylindrical extensions 4—4. The control arm too, is of any suitable construction and supports a wheel spindle on which the vehicle wheel may be mounted.

Said cylindrical extensions at the pivot member ends may provide substantially cylindrical bearings, or if desired, and as shown, a separate tubular hardened-steel liner 5 may be fixedly or rigidly mounted encircling each extension to provide the cylindrical bearing surface thereat.

A bushing or sleeve 6, preferably of a self-lubricating plastic or plastic-like material having an extremely low coefficient of friction, such as of delrin, nylon, laminated phenolics, etc., to afford silence of action and proper damping characteristics, as well as having a long and trouble-free life, is seated on each extension end in bearing relation with said liner.

The plastic bushing is backed up by a metal cup-shaped joint housing or support 22 to retain the bushing in place during all radial and longitudinal thrusts thereon, and said housing, of generally tubular form encircles said cylindrical extension and snugly receives said sleeve. Any proper means such as a press-fit or the screw threads 7 may rigidly interlock the housing to the arm, somewhat as indicated. Although the housing may be made in any manner, I prefer that it be formed by forging or stamping, and wherein one or more grooves 8 are formed for wrench engagement to afford turning torque for assembling.

In the forms shown, the axially outermost end of the sleeve is provided with a radially inwardly directed end flange 9, and the adjacent end of the housing is similarly provided with a radially inwardly directed flange 10 that is positioned axially outwardly beyond the corresponding radial flange of the sleeve.

It will be seen that the housing and arm must move together, preferably carrying the sleeve therewith so that the movable bearing action preferably occurs only between the sleeve and pivot arm bearing.

Suitable means may be provided for maintaining the joint parts in their desired relationship, as for instance that shown in Fig. 2, wherein a stud 11 is in adjustable threaded engagement with an axially extending cooperating threaded opening in the outermost end of the pivot member, so that a tightening up of the stud will draw the parts into predetermined snug relationship with at least one end of the sleeve abutting longitudinally against the adjacent end of the cylindrical bearing.

The other end of the sleeve may also be provided with an end flange 12, also directed radially but reversely to that of the flange at the other end, and if so desired the liner at said first-mentioned end may be reentrantly at an angle to said flange, as at 13, to overlie the peripheral edge of the sleeve thereat to act substantially as a seal against leakage of dirt, water, etc., into the opposed bearing areas between the sleeve and liner.

In order to avoid metal-to-metal engagement between the opposed parts of the stud and housing, a plastic washer 23 may be interposed betwen said opposed parts.

In the modification shown in Figs. 4 and 5, the axially innermost end of sleeve 14 is spaced slightly from the adjacent end of the liner, the tubular portion of the housing 15 extending longitudinally thereat to enclose said liner end, and a yieldably resilient O ring 16, of a rubber-like material, is interposed between said adjacent ends of the sleeve and liner, in said space, so that the axial pressure forcing the sleeve compresses said ring, the latter therefore acting as a seal against entry of water, dirt, etc., and absorbing longitudinal thrust on said sleeve.

If desired, one or more oil ducts 17 may be made in the inner cylindrical face of the sleeve, as shown in Fig. 5, to add further lubricating quality to the bearing areas.

In the form shown in Fig. 4, the end extension of the pivot member is provided with a portion 18 exially outwardly beyond the bearing, and is threaded to receive an adjusting nut or stud 19, and in this instance the adjacent radially directed flange may have an axially directed portion 20 to engagingly oppose said axial thrust means and provide a non-metallic terminal area against said thrust means.

In both forms shown, all load, both radial and longitudinal, is absorbed by the plastic sleeve, and any high loads that are apt to occur in service are well taken care of. Further, the cylindrical bearing areas are in predetermined amounts and there is no opportunity for accidental longitudinal shifting of the parts, such as might occur with threaded interconnections thereat. Thus, there can be no axial shifting of the control arm relative to the pivot member such as could occur with a screw-threaded interconnection, because it is obvious that cooperating threads must have even a minimum degree of clearance or play to permit of operation.

Also, with threaded mating elements, rotation of one such element requires that the other element shift axially, and such shifting movement is absolutely undesired inasmuch as it puts the parts under stress and shortens the effective safe life of said parts. Joints as shown and decribed obviate this undesirable longitudinal shifting of the arm relative to the pivot member.

I claim:

1. A pivot joint for interconnecting an arm member to a pivot member for transmitting longitudinal and radial load therebetween, comprising a cylindrical bearing substantially coaxial with said pivot member at one end of the latter, a joint housing having a longitudinal bore therein encircling said bearing and rotatable relative thereto, a low-friction bearing element engaging between said bearing and bore, and means engaging said end of the pivot member for holding the same and said housing in substantially predetermined position axially in either direction during said rotational movement.

2. A pivot joint for interconnecting an arm member to a pivot member to transmit radial and longitudinal load therebetween, comprising a substantially cylindrical bearing element fixed to one end of said pivot member, a joint housing rotatable relative to said element and having a longitudinal bore that encircles said bearing element, a low-friction bearing sleeve engaging between said bearing element and bore, and means forcing an end of said sleeve axially against said pivot member for preventing relative longitudinal movement in either direction between said pivot member and sleeve during said rotational movement.

3. A pivot joint for interconnecting an arm member and a pivot member to transmit load therebetween, comprising a substantially cylindrical bearing on one end of said pivot member, a joint housing rotatable relative to said element and having a longitudinal bore that encircles said bearing, a low-friction bearing sleeve engaging between said bearing and bore and having a radially inwardly-directed end flange, and means longitudinally engaging an end of said pivot member and forcing said flange longitudinally toward said end of the pivot member for holding the pivot member and sleeve in substantially predetermined axial relation in either direction during said rotational movement.

4. A pivot joint for interconnecting an arm member to a pivot member to transmit longitudinal and radial load therebetween, comprising a substantially cylindrical bearing on one end of said pivot member, a joint housing having a longitudinal bore encircling said bearing, a low-friction plastic bearing sleeve engaging between said bearing and bore and having radial flanges at its ends, one of said flanges directed radially inwardly and the other flange directed radially outwardly, and means carried by said pivot member for longitudinally clamping both of said flanges against said pivot member and holding said sleeve and pivot member fixed in longitudinal relation during rotation of said housing.

5. A pivot member interconnecting an arm member to a pivot member to transmit longitudinal and radial load therebetween, comprising a substantially cylindrical tubular metal liner received on one end of said pivot member and provided with a radially inwardly directed end flange, a joint housing having a longitudinal bore encircling said liner, a low-friction bearing sleeve engaging between said liner and bore and engaging said flange, and means engaging said end of the pivot member for forcing said sleeve and liner longitudinally toward said end of the pivot member for maintaining fixed axial relationship therebetween.

References Cited in the file of this patent

UNITED STATES PATENTS

| | | |
|---|---|---|
| 2,098,703 | Geyer | Nov. 9, 1937 |
| 2,400,238 | Leighton | May 14, 1946 |
| 2,431,120 | Howe | Nov. 18, 1947 |
| 2,778,664 | Herbenar | Jan. 22, 1957 |
| 2,797,929 | Herbenar | July 2, 1957 |
| 2,827,303 | Herbenar | Mar. 18, 1958 |
| 2,880,026 | Moskovitz | Mar. 31, 1959 |
| 2,882,079 | Hoopes | Apr. 14, 1959 |

FOREIGN PATENTS

| | | |
|---|---|---|
| 632,541 | Great Britain | Oct. 28, 1949 |